No. 889,739.

W. B. WOODRUFF.
WOODWORKING MACHINE.
APPLICATION FILED JUNE 27, 1907.

PATENTED JUNE 2, 1908.

WITNESSES

INVENTOR
WILLIS BYRON WOODRUFF
BY
ATTORNEYS

No. 889,739. PATENTED JUNE 2, 1908.
W. B. WOODRUFF.
WOODWORKING MACHINE.
APPLICATION FILED JUNE 27, 1907.

WITNESSES
F. C. Barry
C. E. Trainor

INVENTOR
WILLIS BYRON WOODRUFF
BY Munn & Co.
ATTORNEYS

No. 889,739. PATENTED JUNE 2, 1908.
W. B. WOODRUFF.
WOODWORKING MACHINE.
APPLICATION FILED JUNE 27, 1907.

WITNESSES
INVENTOR
WILLIS BYRON WOODRUFF
BY
ATTORNEYS

No. 889,739.

W. B. WOODRUFF.
WOODWORKING MACHINE.
APPLICATION FILED JUNE 27, 1907.

PATENTED JUNE 2, 1908.

WITNESSES

INVENTOR
WILLIS BYRON WOODRUFF
BY
ATTORNEYS.

No. 889,739. PATENTED JUNE 2, 1908.
W. B. WOODRUFF.
WOODWORKING MACHINE.
APPLICATION FILED JUNE 27, 1907.

WITNESSES
INVENTOR
WILLIS BYRON WOODRUFF
BY
ATTORNEYS

UNITED STATES PATENT OFFICE.

WILLIS BYRON WOODRUFF, OF CADIZ, KENTUCKY.

WOODWORKING-MACHINE.

No. 889,739.　　　　　Specification of Letters Patent.　　　　Patented June 2, 1908.

Application filed June 27, 1907. Serial No. 381,046.

*To all whom it may concern:*

Be it known that I, WILLIS BYRON WOODRUFF, a citizen of the United States, and resident of Cadiz, in the county of Trigg and State of Kentucky, have invented an Improvement in Woodworking-Machines, of which the following is a specification.

My invention is an improvement in wood working machines, and consists in certain novel constructions and combinations of parts hereinafter described and claimed.

The object of the invention is to provide a machine capable of cutting a stick of timber with parallel sides, inclined sides, or in irregular form following a pattern.

Referring to the drawings forming a part hereof.

The mechanism is supported by a frame comprising the cheek pieces 1, provided with legs 2, secured to any suitable base by the bolts 3, the said cheek pieces being spaced apart from each other in the usual manner.

A plurality of bearings 4 are arranged on the upper edge of the cheek pieces, and within the bearings are journaled a plurality of upper feed rollers 5 of ordinary construction, one end of the feed roller shafts being provided with gear wheels 6, intermeshing with idlers 7 arranged between the said gear wheels, and lower feed rollers 8 are journaled between the cheek pieces, one of the ends of the shafts of the rollers being provided with gear wheels 9, meshing with idlers 10, which in turn mesh with the idlers 7 before described. The said rollers are driven through a train of gears 11, connecting one of said gear wheels with a gear wheel 12, on a shaft 13, journaled in bearings 14 in the cheek pieces, and provided with a pulley 15 connected by a belt 16 with a pulley 17, on the drive shaft 18, journaled in suitable bearings 19 in the cheek pieces, and in a bearing 20 on a bracket 21 adjacent to the frame, and secured by bolts 22 to the foundation.

A series of open bearings 23 are arranged in horizontal alinement upon each of the cheek pieces, and rollers 24 are journaled in the bearings, the said rollers extending between the cheek pieces for a purpose to be hereafter described, and being removable from the bearings.

A pair of spaced brackets 25 is connected to the upper edge of each of the cheek pieces at approximately the center thereof, the pairs being opposite each other, and the members of the pairs being provided with vertical guideways 26, in which move lugs 27 integral with bearings 28, and a shaft 29 is journaled in the bearings, the shaft extending between the cheek pieces and being provided with cutters 30 for operating upon the upper face of the material.

The bearings 28 are each provided with depending portions 31, having slots 32 in their lower ends, in which are slidably mounted bearings 33, the said bearings being retained in their adjusted position by set screws 34 threaded through lugs 35 on the depending portion and engaging the bearings. A pattern guide roller 36 is journaled in the bearings, the said roller extending between the cheek pieces.

One of the members of each pair of the brackets 25 has pivotally connected therewith the two parts of a split nut 37, the said parts being adapted to engage the other member of the pair and to be secured thereto by a bolt 38, and the said nut is adapted to engage when closed a screw threaded rod 39, connected with the bearing 28 before described, and having upon its upper end a bevel gear 40.

Figure 14:
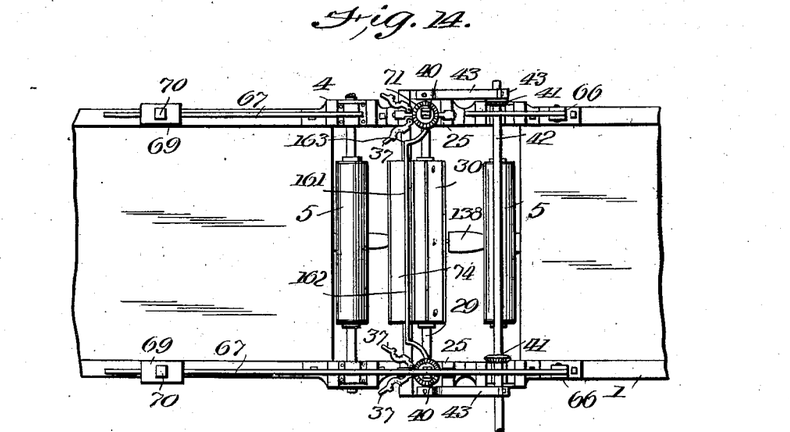
Fig. 14 is a plan view of a portion of the machine showing the power feeding device for the upper cutter out of operation.
Figure 15:
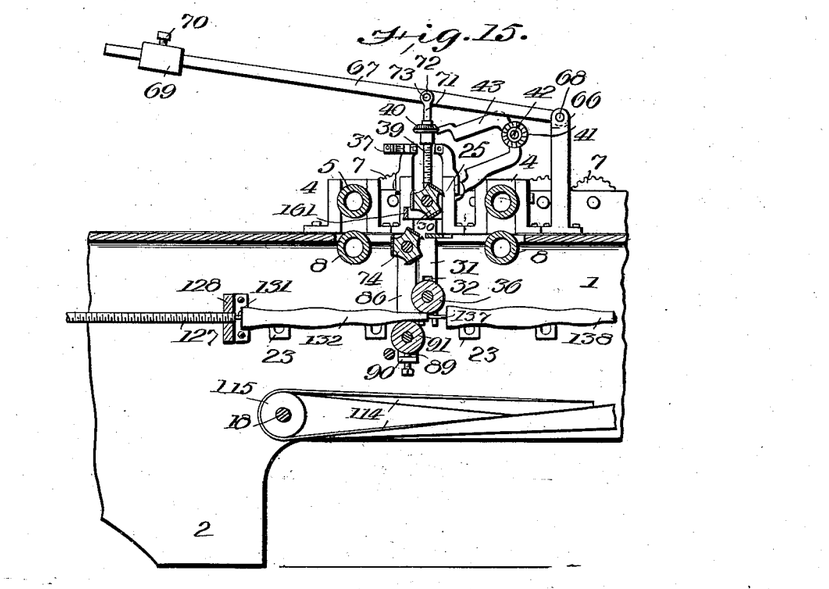
Fig. 15 is a central longitudinal section of Fig. 14.

The bevel gears 40 are engaged by bevel gears 41 on a transverse shaft 42 journaled in the body portions of U-shaped brackets 43, which have one of their arms hinged as at 44, to one of the members of the pairs of brackets 25, in such manner that the U-shaped brackets 43 may be swung into the position shown in Figs. 14 and 15. The outer end of the shaft 42 is provided with a stepped cone pulley 45, and with a crank 44ª, and the stepped cone pulley is connected by a belt 47 with a stepped cone pulley 48, on a stud shaft 49, journaled in one of the cheek pieces. The stud shaft 49 has slidable thereon a sleeve 50, the sleeve being keyed to the shaft and provided with a gear wheel 51, and a groove 52, in which engages a fork 53 on one end of a lever 54 fulcrumed at 55 on a bracket 56 projecting from the cheek pieces, and provided at its opposite end with a grip 57 for actuating a pawl 58, engaging a toothed arc 59, whereby to retain the lever in its adjusted position.

Stud shafts 59 and 60 are journaled upon each side of the shaft 49, and are provided outside of the cheek pieces with pinions 61 and 62, one of the pinions 61 being farther removed from the cheek piece than the other pinion 62, so that when the sleeve is moved upon the shaft 49, the gear wheel 51 will engage alternately with the pinions 61 and 62. The inner ends of the stud shafts 59 and 60 are provided with pinions 63 and 64 meshing with each other and connected by an idler 65 with the train of gears 11 before described.

It will be evident from the description, that when the machine is in operation, by manipulating the lever 54 to engage the gear wheel 51, with one of the pinions 61, 62, the cone pulley 48 may be driven in either direction, and through the belt connection 47 with the cone pulley 45, the threaded rods 39 will be moved to raise or to lower the bearings 28 carrying the cutter shaft 29, and that by engaging the belt with different steps of the cones, the relation of the speed of the transverse shaft and the stud shaft 49 may be varied.

When it is not desired to drive the cutter roll moving device, the belt 47 is removed, and the U-shaped brackets are turned back into the position shown in Figs. 14 and 15. When the machine is so used, means is provided for exerting a steady and yielding pressure on the cutter roll, the said means comprising brackets 66, to which are pivotally connected the inner end of bars 67, by means of a bolt 68, and the said bars are provided on their outer ends with weights 69, slidable thereon, and secured in their adjusted position by a set screw 70. An arm 71 is threaded into an opening in the upper end of the rod 39, and is connected to the arm as at 72, by a bolt 73.

The lower cutter roll 74 is journaled in bearings 75 provided with lugs 76, movable in guideways 77, in boxes 78 on the cheek pieces, and on the lower faces of the said bearings are spring seats 79, for receiving the inner end of spring 80, the other end of the spring resting in seats 81 in the boxes. A set screw 82 is passed through a slot 84 in the boxes, and is threaded into an opening 85 of the bearing, so that by tightening the screw, the bearing may be fixed with respect to the box. The bearings 75 are provided with depending portions 86 having in their lower ends slots 87 in which are slidable bearings 88, the bearings being retained in their adjusted position by a set screw 89, threaded through a lug 90 on the depending portion, and engaging the bearings, and a pattern guide roll 91 is journaled in the bearings 88.

At a suitable distance from the horizontal cutters, the vertical cutters 92 are arranged, the said cutters being supported on the upper ends of shafts 93. The shafts 93 are provided at their lower ends with nuts 94, having on their outer faces grooves 95, and the cutter rolls 96 are also provided on their lower ends with grooves 97. Frames 98 comprising side bars 99 and end plates 100 are mounted in guideways 101 on cross bars 102 connected with the cheek pieces, and the said end plates 100 are provided with grooves 103 co-acting with the grooves 95 and 97 to form ball races, in which are arranged balls 104.

Bolts 105 are threaded into the side bars 99, the outer ends of the bolts passing through plates 106, and springs 107 are arranged between the plates and the side bars. Threaded rods 108 are secured to the plates 106, and pass outwardly through the cheek pieces, the opening in the cheek pieces being threaded for engagement by the rods, and the outer ends of the rods are provided with handles 109 for convenience in manipulating the same. Springs 110 are arranged between the plates and the cheek pieces.

It is evident from the description that the frames, and consequently the cutters, may be adjusted toward and from each other by means of the threaded rods. On the inner side bars of the frames, bearings 111 are arranged, in which are journaled pattern engaging rollers 112, and the shafts 93 of the cutters are provided with pulleys 113 connected by belts 114 with pulleys 115, on the drive shaft 18 before described. The frames 98 may be fixed with respect to each other, by means of a rod 116 secured to one of the frames as at 117, and traversing bearings 118 and 119 in the other frame and in the cheek piece, respectively, the said bearings being provided with set screws 120 threaded therethrough and engaging the rod whereby to fix the frames with respect to the cheek pieces.

A depending bracket 121 is arranged at the front of the frame, and the said bracket is provided in its lower end with a bearing 122 in which is journaled a sleeve 123 having a square opening therethrough and provided at its rear end with a bevel gear 124. A hollow shaft 125 is movable through the opening in the sleeve, the said shaft being also hollow, and having secured within the rear end thereof in any suitable manner the square head 126 of a screw threaded rod 127. The rod 127 passes through a threaded opening in a bracket 128 secured to the cheek pieces and extending therebetween, and that portion of the rod 127 adjacent to the square head 126 is devoid of screw threads, as shown at 129.

Figure 4:
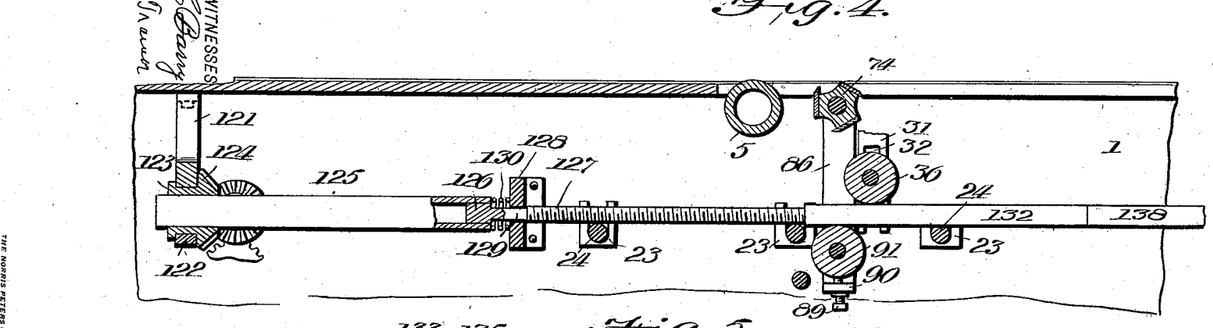
Fig. 4 is a detail of the pattern feature.
Figure 5:
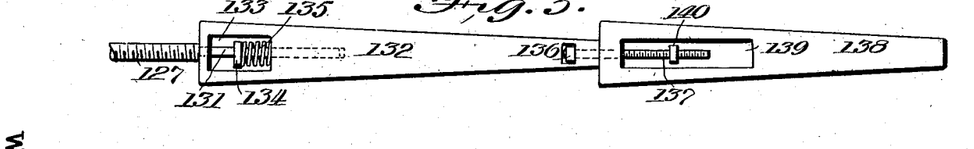
Fig. 5 is a plan view of the patterns in one position.
Figures 6, 7:
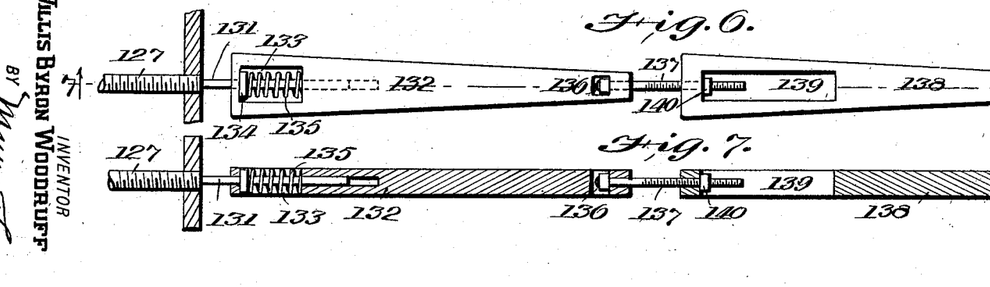
Fig. 6 is a similar view showing patterns in another position.
Fig. 7 is a section on the line 7—7 of Fig. 6.

A spring 130 is secured to the end of the square shaft 125, and is adapted to engage the bracket 128 when the rod is in the position shown in Fig. 4. The free end of the rod 127 is reduced as at 131, and extends into a longitudinal opening in the pattern 132. The pattern 132 is provided with a slot 133 at the end adjacent to the rod, and a collar 134 is connected with the reduced portion of the rod within the said slot, a spring 135 being arranged between the collar and the front end of the slot. The rear end of the pattern 132 is provided with another slot 136, for receiving the head of a bolt 137, which extends through a longitudinal opening in the pattern 132 and through a longitudinal opening in the other pattern 138. A recess 139 is provided in the pattern 138 into which the bolt 137 extends, and a nut 140 on the bolt 137 within the recess, limits the movement of the pattern 138 with respect to the pattern 132.

The bevel gear 124 is adapted to be driven in one or the other direction by bevel gears 141, 142, slidably mounted on alined shafts 143, 144, journaled in bearings 145, 146, on the frame. The bevel gears are moved by a U-shaped frame 147, the said bevel gears being journaled in bearings 148 in the arms of the U-shaped frame, and the frame is moved by means of a lever 149 having one end connected therewith and pivoted at 150 to a bracket 151 extending between the cheek pieces. The free end of the lever is provided with a pawl for engaging a toothed arc 152, whereby to retain the said lever in its proper position.

Figure 8:
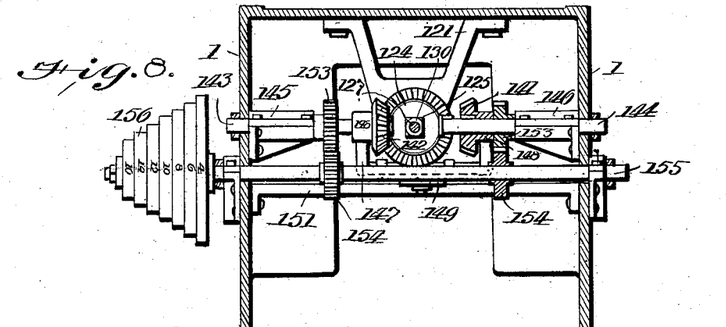
Fig. 8 is a section on the line 8—8 of Fig. 3.
Figure 9:
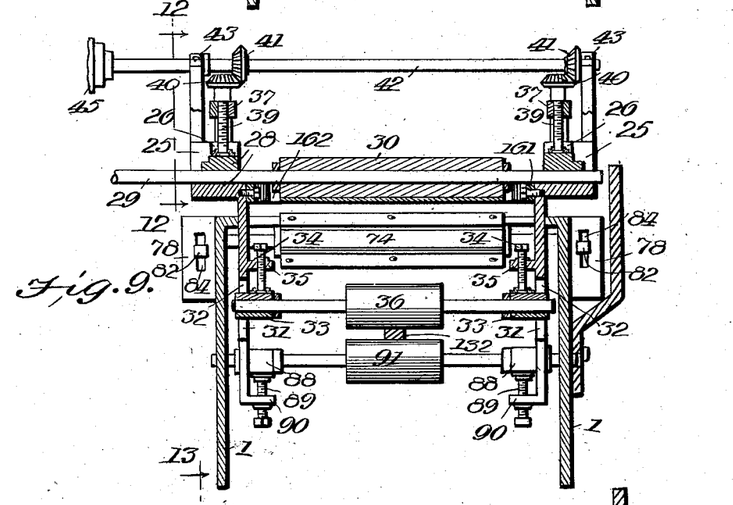
Fig. 9 is a section on the line 9—9 of Fig. 3.
Figure 10:
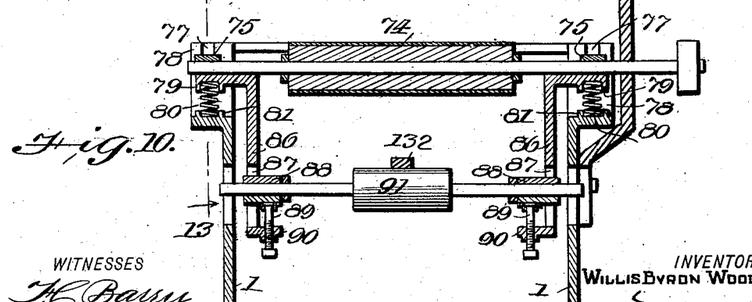
Fig. 10 is a vertical section through the lower cutter roll.

The alined shafts 143, 144, are each provided with a pinion 153, meshing with pinions 154 on a counter-shaft 155, journaled transversely of the frame below the alined shafts, and having on the outer end thereof a stepped cone pulley 156 connected by a belt 157 with a stepped cone pulley 158 on the shaft 13 before described. The U-shaped frame 147 is movable in bearings 159, secured to a cross bar 151, at the front end of the frame, and the bevel gears 141, 142, are keyed to the alined shafts as shown in Fig. 8, whereby to compel them to rotate with the said shafts, but to permit a sliding movement thereon.

A chip breaker 161, comprising a bar 162, is arranged adjacent to the upper horizontal cutter, the bar being provided with arms 163, connected with the bearings of the cutter shaft, whereby to move with the cutter, and brackets 164 are connected with the frames 98 for supporting the vertical cutters, and rollers 165 are journaled on the upper ends of the said brackets at a point immediately in front of the vertical cutters, the said rollers being adapted to engage the sides of the work, to steady the same, and to break the chips loosened by the cutters.

In the operation of my improved machine, when it is to be used for planing articles with parallel sides, the U-shaped frame 147 is moved into position to disengage both the bevel gears 141, 142, from the bevel gear 124. The U-shaped brackets 43 in which the transverse shaft 42 is journaled, are turned into the position shown in Figs. 14 and 15, and the parts of the two-part nut are open to disengage the screw threaded rods 39 as also shown in said figures. The set screws 120 are turned to fix the frames 98 in a rigid position, and the gear wheel 51 on the shaft 49 is moved into a position intermediate the pinions 61 and 62 on the stud shafts 59 and 60.

The bars 67 are connected with the brackets 66, and the arms 71 are screwed into the openings in the upper ends of the screw threaded rods 39, and the bars 67 are connected with the arms, the weights 69 being moved into a suitable position on the bars to retain the cutter in sufficiently firm contact with the work. The machine is now ready for cutting timber with parallel sides.

Figure 1:
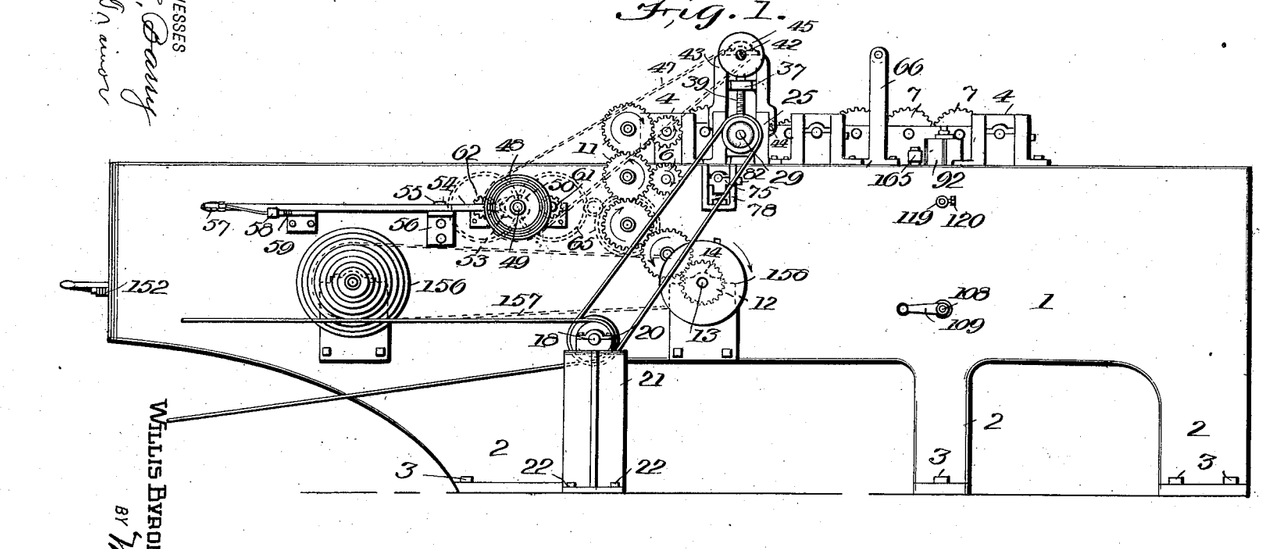
Figure 1 is a side elevation of my improved machine.
Figure 2:
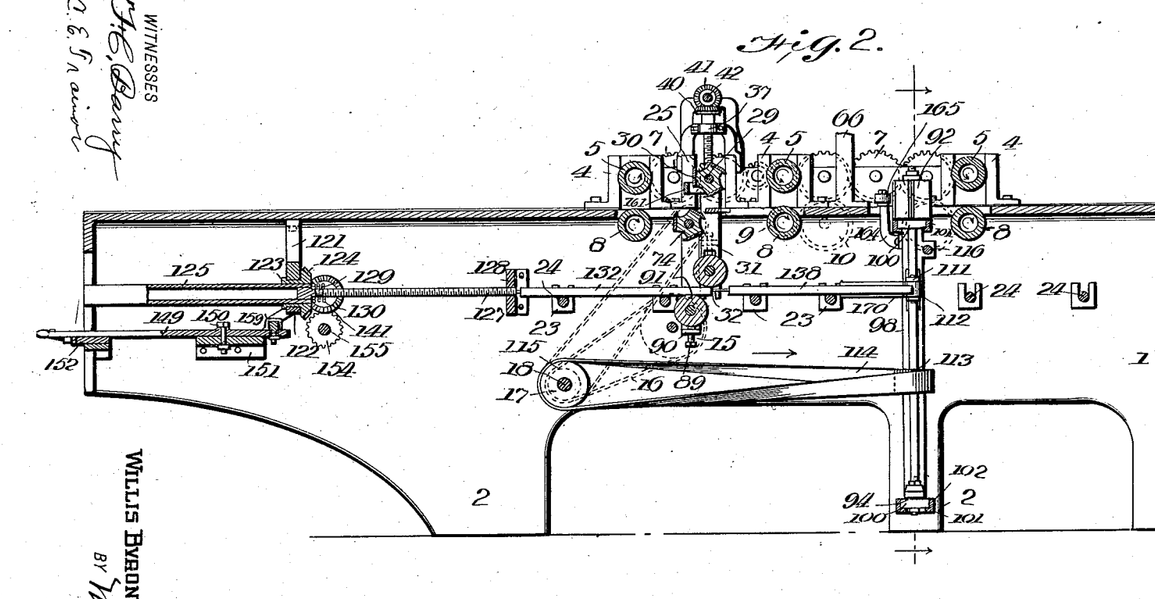
Fig. 2 is a vertical longitudinal section.
Figure 3:
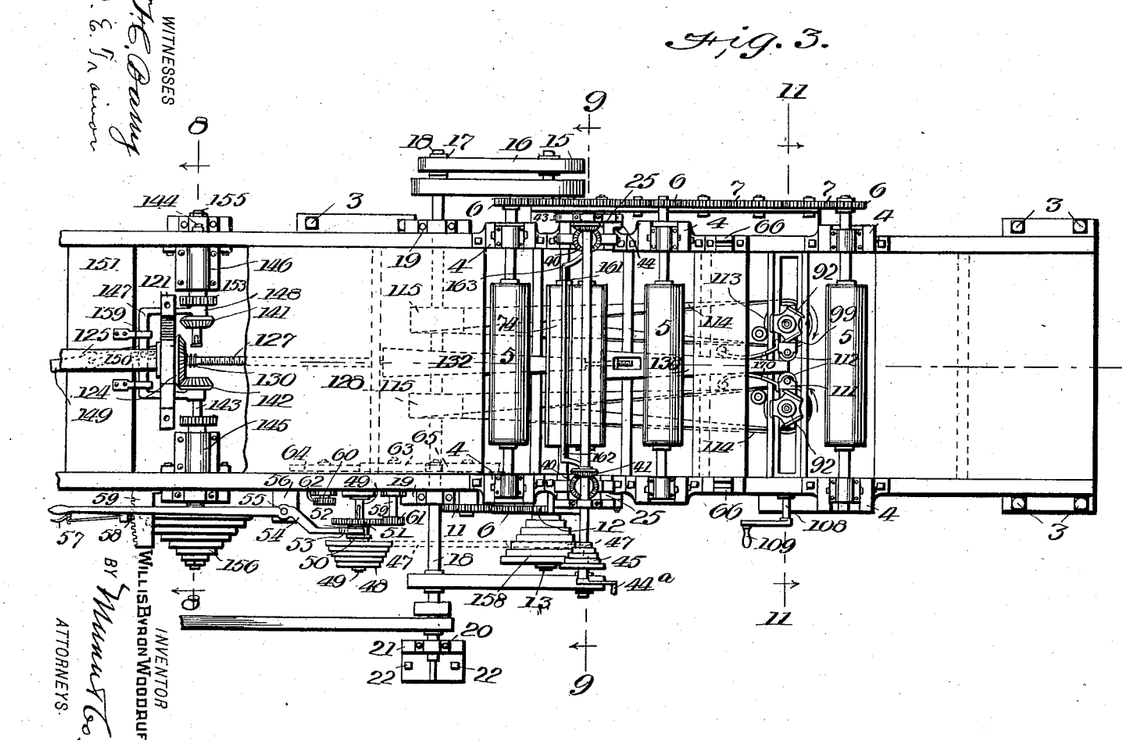
Fig. 3 is a plan view.

When it is desired to cut timber with inclined sides, the U-shaped brackets are turned down into the position shown in Fig. 2, and the two-part nuts are closed into engagement with the screw threaded rods, as also shown in such figure, the bars 67 being removed from the machine, or turned back out of engagement with the rod. The stepped cone pulley on the shaft 13 is connected by the belt 16 with the stepped cone pulley on the stud shaft 49, and the pinion on the stud shaft is connected with one of the pinions on the stud shafts 59 or 60. When now a piece of timber having inclined sides is started through the machine, the cutter shaft 29 will be gradually moved towards or from the cutter shaft 74, depending upon which of the stud shafts 59 or 60 is driving the stud shaft 49, it being immaterial whether the large or small end of the timber is introduced first.

When the first piece has passed through the horizontal cutters, the rotation of the stud shaft 49 will be reversed, and, since the movement of the upper cutter shaft is now reversed, it is evident that the second piece of timber must enter the cutters reversed, that is, if the first piece of timber enters the machine with its small end first, the second piece must enter with its large end first.

By the above described arrangement it is evident that the machine may be operated continuously to plane pieces of timber having two inclined sides, it only being necessary to reverse the alternate pieces.

It will be understood that patterns may be made use of for the above purpose if desired, in which the same procedure would be followed as described below for cutting irregular forms.

For cutting irregular forms, the set screws engaging the rod 116 are released, and one of the bevel gears 141 or 142 is engaged with the bevel gear 124, the usual connection being such as to first move the patterns from the front to the rear of the machine.

As the pattern 132 passes between the pattern engaging rollers 36 and 91, the cutter shafts 29 and 74 are moved towards or from each other, depending upon the contour of the upper and lower faces of the pattern. As the pattern 138 moves between the pattern engaging rollers 112 the vertical cutters are moved towards or from the material in accordance with the contour of the sides of the said pattern.

When the spring 130 engages the bracket 128, and is in a state of compression, the plain portion of the screw threaded rod, is within the threaded opening of the bracket, so that the motion of the screw threaded rod ceases until the rotation of the bevel gear 124 is reversed. When this reversal takes place, the springs 130 and 133 immediately force the screw threaded portion of the rod into engagement with the screw threads of the opening whereby to return the patterns to the original position. It will be understood that the engagement of the spring with the bracket takes place at the time the patterns have passed to their farthest rearward limit.

Since two patterns are made use of, one representing the horizontal faces and the other the vertical faces of the article to be shaped, it is evident for articles intended to have irregular horizontal faces, the rollers 23 over which the pattern 132 would pass must be removed from their bearings.

It will be understood that there is a definite relation between the feed of the material operated upon and the feed of the pattern, and that this relation is varied by the position of the belt 157 connecting the stepped pulleys 156 and 158, and it is obvious that the full length of the pattern must pass between the rollers during the same time that the full length of material passes between the corresponding cutter shafts.

If the timber is 12 feet in length, and the pattern is 12 inches, then the feed of the pattern and of the material will be so arranged that for every inch of pattern passing between the pattern engaging rollers, a foot of material will pass between the cutters.

The position of the nut 140 on the bolt 137 limits the distance between the adjacent ends of the patterns, which distance corresponds relatively to the distance between the horizontal and the vertical cutters, that is, if the patterns are on a scale of one inch to the foot, and the horizontal cutters are two feet from the vertical cutters, the distance between the adjacent ends of the patterns should be two inches. The above provision permits the piece of timber to reach the vertical cutters before the pattern operating said cutters begins to move. The front pattern is also of greater length than the rear pattern, the difference between the length of the pattern corresponding to the relative distance between the horizontal and vertical cutters, that is, if, as in the instance above, the patterns are on a scale of one inch to a foot, and the horizontal cutters are two feet from the vertical cutters, the front pattern will be two inches longer than the rear pattern.

It will be evident from the description, that when the machine is arranged to cut irregular forms, its movement may be made continuous, the alternate timbers being cut reversely from the intermediate timbers, by merely reversing the motion of the bevel gear 124 after the completion of each timber. Springs 170 are connected with the frames 98 for engaging the sides of the pattern 138 to steady said pattern.

The purpose of the spring 130 and the plain portion 129 of the threaded rod 127 is to prevent breakage by stopping the movement of the patterns when they have reached the limit of their rearward travel, if the operator should neglect to reverse their movement. The spring 125 and the reduced portion 131 of the threaded shaft perform a like function at the end of the forward travel of the pattern.

Figure 11:
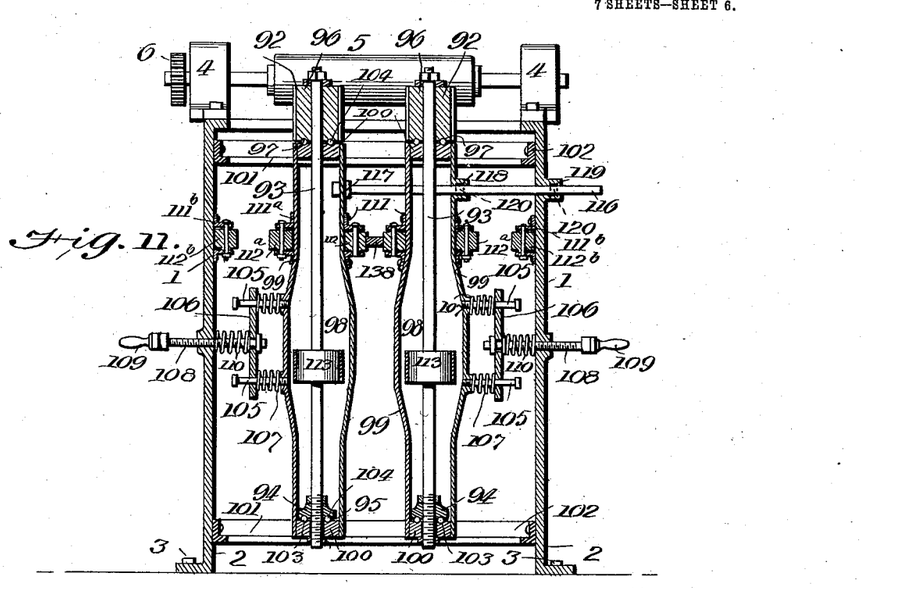
Fig. 11 is a section on the line 11—11 of Fig. 3.
Figure 12:
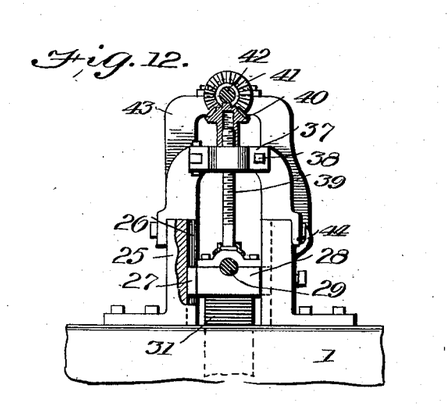
Fig. 12 is a section on the line 12—12 of Fig. 9.
Figure 13:
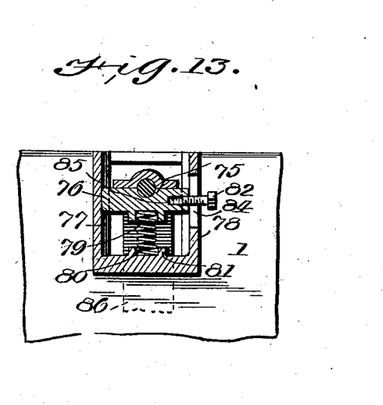
Fig. 13 is a section on the line 13—13 of Fig. 10.

It will be noticed from an inspection of Fig. 11, that bearings 111$^a$ are arranged on the outer side members of the frames 98, in which are journaled rollers 112$^a$, and that other bearings 111$^b$ are arranged on the side members 1 of the main frame, having also journaled therein rollers 112$^b$. The bearings 111$^a$ and 111$^b$ are ordinarily not provided with rollers, and are adapted to receive the rollers 112 when the machine is used for certain purposes, such as flooring, use being made in this instance of a plurality of patterns running on each side of the frames for the cutter heads, and the flooring being fed through the machine in accordance with the position of the patterns.

I claim:

1. A wood working machine comprising a frame, upper and lower pairs of oppositely arranged bearings, slidable vertically in the frame, a horizontal cutter shaft journaled in each of the pairs, springs for supporting the lower pair of bearings, said upper bearings being provided each with an upwardly extending screw threaded rod, a bevel gear on the upper end of each rod, brackets arranged on each side of the frame, swinging frames connected with the brackets, a shaft journaled in the swinging frames, provided with bevel gears for engaging the bevel gears of the rods, a two-part nut connected with the brackets for engaging each of the rods, a stepped cone pulley on the transverse shaft, a stud shaft journaled in the frame, a stepped cone pulley on the stud shaft, a belt connecting the pulleys, a driving shaft, a connection between the driving shaft and the stud shaft, and means for reversing the connection whereby to drive the stud shaft in opposite directions.

2. A wood working machine, comprising a frame, upper and lower cutter shafts journaled in the frame, springs supporting said lower shaft, said upper shaft having connected therewith upwardly extending screw threaded rods, bevel gears on the free ends of the rods, brackets arranged on each side of the frame, swinging frames connected with the brackets, a shaft journaled in the swinging frames and provided with bevel gears for engaging the bevel gears of the rods, a two-part nut on each bracket for engaging the adjacent rod, a stepped cone pulley on the transverse shaft, a stud shaft journaled in the frame, a stepped cone pulley on the stud shaft, a belt connecting the pulleys, a driving shaft, a connection between the driving shaft and the stud shaft, and means for reversing the connection whereby to drive said shafts in opposite directions.

3. A wood working machine, comprising a main frame, upper and lower horizontal cutter shafts journaled in the frame, springs for supporting said lower shaft, means for moving said upper shaft toward and from the lower shaft, said means comprising upwardly extending screw threaded rods in connection with the ends of the shaft, bevel gears on the upper ends of the rods, a shaft journaled transversely of the frame and provided with bevel gears for engaging the bevel gears of the rods, a fixed nut engaging each of the rods, a stepped cone pulley on the transverse shaft, a stud shaft journaled in the frame, a stepped cone pulley on the stud shaft, a belt connecting the pulleys, a driving shaft, a connection between the driving shaft and the stud shaft, and means for reversing the connection whereby to drive the stud shaft in opposite directions.

4. A wood working machine, comprising a main frame, upper and lower pairs of oppositely arranged bearings slidable vertically in the main frame, a horizontal cutter shaft journaled in each of the pairs, each of said bearings being provided with depending portions, pattern engaging rollers journaled in the depending portions and parallel with the cutter shafts, springs for supporting the lower pair of bearings, said upper bearings being provided each with an upwardly extending screw threaded rod, a bevel gear on the upper end of each rod, brackets arranged on each side of the main frame, swinging frames connected with the brackets, a shaft journaled in the swinging frames and provided with bevel gears for engaging the bevel gears of the rods, a two-part nut connected with the brackets engaging each of the rods, a stepped cone pulley on the transverse shaft, a stud shaft journaled in the frame, a stepped cone pulley on the stud shaft, a belt connecting the pulleys, a driving shaft, a connection between the driving shaft and the stud shaft, and means for reversing the connection whereby to drive the stud shaft in opposite directions.

5. A wood working machine, comprising a main frame, upper and lower cutter shafts journaled in the frame, springs supporting said lower shaft, said upper shaft having connected therewith upwardly extending screw threaded rods, bevel gears on the free ends of the rods, brackets arranged on each side of the main frame, swinging frames connected with the brackets, a shaft journaled in the swinging frames and provided with bevel gears for engaging the bevel gears of the rods, a two-part nut on each bracket for engaging the adjacent rod, a stepped cone pulley on the transverse shaft, a stud shaft journaled in the frame, a stepped cone pulley on the stud shaft, a belt connecting the pulleys, a driving shaft, a connection between the driving shaft and the stud shaft, and means for reversing the connection whereby to drive shaft in opposite directions.

6. A wood working machine, comprising a main frame, upper and lower horizontal cutter shafts journaled in the frame, springs for supporting said lower shaft, means for moving said upper shaft towards and from the lower shaft, said means comprising upwardly extending screw threaded rods, in connection with the ends of the shaft, bevel gears on the upper ends of the rods, a shaft journaled transversely of the frame and provided with bevel gears for engaging the bevel gears of the rods, a fixed nut engaging each of the rods, a stepped cone pulley on the transverse shaft, a stud shaft journaled in the frame, a stepped cone pulley on the stud shaft, a belt connecting the pulleys, a driving shaft, a connection between the driving shaft and the stud shaft, and means for reversing the connection whereby to drive the shaft in opposite directions.

7. A wood working machine, comprising upper and lower horizontal cutter shafts, said lower shaft being yieldingly supported, means for moving said upper shaft toward and from the lower shaft, said means comprising screw threaded rods in connection with the ends of the shaft, fixed nuts through which said rods are threaded, means for rotating said rods in unison, a driving shaft, a connection between the driving shaft and said rotating means, and means for reversing said connection whereby to reverse the motion of the rods.

8. In a wood working machine, a pair of cutter shafts, one of said shafts being yieldingly supported, and means for moving the other shaft toward and from the yieldingly supported shaft, comprising screw threaded rods in connection with the ends of said shaft, fixed nuts through which the rods are threaded, means for feeding the work between the cutter shafts, means in connection with the work feeding means for rotating said shafts in unison, and means whereby to reverse the movement of rotation of the rods.

9. A wood working machine, comprising a main frame, upper and lower horizontal cutter shafts journaled in the frame, springs for supporting the lower shaft, means for elevating and depressing the upper shaft, means for feeding material between the cutter shafts, and a connection between the feeding means and the elevating and depressing means, whereby the operation of the feeding means will gradually elevate or gradually depress the cutter shaft, and means for reversing the connection.

10. A wood working machine, comprising upper and lower horizontal cutter shafts, one of said shafts being yieldingly supported, means for moving the other shaft toward and from the yieldingly supported shaft, means for feeding the work between the cutter shafts, and a connection between the feeding means and the shaft moving means, whereby the operation of the feeding means will gradually move said shaft toward or from the other shaft, and means for reversing the connection.

11. In a wood working machine, a pair of cutter shafts, and means for moving one of said shafts toward and from the other shaft, comprising screw threaded rods in connection with the ends of said movable shaft, fixed nuts through which the rods are threaded, means for feeding the work between the cutter shafts, means in connection with the work feeding means for rotating said shafts in unison, and means for reversing the movement of rotation of the rods.

12. In a wood working machine, a pair of cutter shafts, and means for moving one of said shafts toward and from the other shaft, means for feeding the work between the cutter shafts, means in connection with the work feeding means for gradually moving said movable shaft toward and from the other shaft, and means for reversing the movement of said shaft.

13. In a wood working machine, a pair of cutter shafts, one of said shafts being yieldingly supported, and means for moving the other shaft toward and from the yieldingly supported shaft, comprising screw threaded rods in connection with the ends of said movable shafts, fixed nuts through which the rods are threaded, means for feeding the work between the cutter shafts, means in connection with the work feeding means for rotating said shafts in unison, and means for varying the relative speed of the work feeding means and the rotating means.

14. In a wood working machine, a pair of cutter shafts, and means for moving the one shaft toward and from the other shaft, said means comprising screw threaded rods in connection with the ends of said shaft, fixed nuts through which the rods are threaded, means for feeding the work between the cutters, means for rotating the rods in either direction, a connection between said means and the work feeding means, and means for varying the relative speed of the work feeding means and the rotating means.

15. A wood working machine comprising a main frame, opposed cutter shafts journaled in the frame, means for feeding material between the cutter shafts, means for moving one of said shafts toward and from the other shaft, and a connection between the feeding means and the shaft moving means whereby the operation of the feeding means will gradually move said cutter shaft toward and from the other shaft, and means for reversing the connection.

WILLIS BYRON WOODRUFF.

Witnesses:
ROBERT CRENSHAW,
G. B. BINGHAM.